(12) United States Patent
Chen et al.

(10) Patent No.: US 12,500,427 B2
(45) Date of Patent: Dec. 16, 2025

(54) CHARGE CONTROL SYSTEM AND METHOD THEREOF

(71) Applicant: NUVOTON TECHNOLOGY CORPORATION, Hsinchu (TW)

(72) Inventors: Fu-Min Chen, Hsinchu Science Park (TW); Ming-Che Hung, Hsinchu Science Park (TW); Chia-Ching Lu, Hsinchu Science Park (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 811 days.

(21) Appl. No.: 17/815,923

(22) Filed: Jul. 28, 2022

(65) Prior Publication Data
US 2023/0035120 A1 Feb. 2, 2023

(30) Foreign Application Priority Data
Jul. 30, 2021 (TW) ................................ 110128097

(51) Int. Cl.
*H02J 7/00* (2006.01)
*G06F 1/3212* (2019.01)

(52) U.S. Cl.
CPC ........ *H02J 7/00034* (2020.01); *G06F 1/3212* (2013.01); *H02J 7/0047* (2013.01); *H02J 7/007184* (2020.01)

(58) Field of Classification Search
USPC ......................................................... 320/114
See application file for complete search history.

(56) References Cited

U.S. PATENT DOCUMENTS

| 10,884,475 B1* | 1/2021 | Wang ................... G06F 1/3296 |
| 2020/0136401 A1* | 4/2020 | Thompson .......... H02J 7/00304 |
| 2020/0373774 A1* | 11/2020 | Abe .................... H02J 7/00712 |

* cited by examiner

*Primary Examiner* — Samuel Berhanu
(74) *Attorney, Agent, or Firm* — Snyder, Clark, Lesch & Chung, LLP

(57) ABSTRACT

A charge control system includes a memory and a processing unit. The memory integrates a power consumption of the electronic device, a sleep signal, a boot signal, a hibernate signal or a shutdown signal received by the electronic device, a charge status of the charger, and a remaining power of the battery at the previous time point, as previous usage information. The processing unit creates an estimation model based on the previous usage information and an algorithm, to estimate an estimated power consumption of the electronic device, the estimated power of the battery and the charge probability of the charger corresponding to the current time point, the processing unit determines a target voltage based on the estimated power consumption, the estimated power, and the charge probability, the processing unit controls the charger to charge the battery, based on a current voltage and a target voltage.

11 Claims, 7 Drawing Sheets

CHARGE CONTROL SYSTEM AND METHOD THEREOF

CROSS-REFERENCE TO RELATED APPLICATION

This application claims the benefit of Taiwan Patent Application No. 110128097, filed on Jul. 30, 2021, in the Taiwan Intellectual Property Office, the disclosure of which is incorporated herein in its entirety by reference.

BACKGROUND OF THE INVENTION

1. Field of the Invention

The present invention is related to a charge control system which is capable of controlling charging and power consumption of a battery no matter the electronic device is in an operating state or shutdown state, and a method thereof.

2. Description of the Related Art

Users of mobile phones or laptops have the most direct experience about battery power. The most troublesome thing is that more fully-charging operations for battery in electronic device causes the amount of fully-charged power to actually become less, so the mobile phones or laptops becomes unbearable to use and the users has to buy new products. There are some reasons that adversely affect the power capability of battery, for example, more cycle-charging operations may decrease the maximum usable capacity of battery; in addition, storing excessively high or low power in a battery may reduce the service life of battery.

The conventional charge control system for battery is designed to fully charge a battery to a fixed value, so as to reduce the problem caused by cyclic charging.

The electronic device is operated at different modes for different usage conditions, such as a power-on mode, a power-off mode, a sleep mode and a hibernation mode, but the conventional charge control system is started only when the electronic device is operating, and it is unable to respond to the power consumption of the battery of the electronic device in different modes.

Therefore, what is needed is to develop a charge control system and a method thereof, to solve the above-mentioned conventional problems and promote the industrial practicability.

SUMMARY OF THE INVENTION

An objective of the present invention is to provide a charge control system and a method thereof, to solve the above-mentioned conventional problems.

In order to achieve the objective, the present invention provides a charge control system including a memory and a processing unit. The memory is coupled to a battery of an electronic device and a charger, and configured to store and integrate a power consumption of the electronic device at a previous time point, a sleep signal, a boot signal, a hibernate signal or a shutdown signal received by the electronic device at the previous time point, a charge status of the charger at the previous time point, a remaining power of the battery at the previous time point, to be previous usage information. The processing unit is coupled to the battery, the charger and the memory, and configured to create an estimation model based on the previous usage information and an algorithm, wherein the battery provides a current voltage to the electronic device at the current time point, the estimation model estimates an estimated power consumption of the electronic device at the current time point, an estimated power of the battery at the current time point, and a charge probability of the charger at the current time point, the processing unit determines a target voltage based on the estimated power consumption, the estimated power, and the charge probability, wherein the current time point and the previous time point comprise at least one of a boot time of the electronic device, a hibernate time of the electronic device, a shutdown time of the electronic device and a sleeping time of the electronic device. The processing unit selectively controls the charger to charge the battery based on a relationship between the current voltage and the target voltage.

In an embodiment, when the processing unit determines that the voltage is lower than the target voltage, the processing unit controls the charger to perform a first charging operation on the battery.

In an embodiment, when the processing unit determines that the voltage is close to the target voltage, the processing unit controls the charger to perform a second charging operation on the battery, and a first charge amount corresponding to the first charging operation is greater than a second charge amount corresponding to the second charging operation.

In an embodiment, when the processing unit determines that the voltage is higher than or equal to the target voltage, the battery is maintained to supply the current voltage to the electronic device.

In an embodiment, the charge control system further includes a time setting device, wherein the time setting device is coupled to the memory, the time setting device is configured to provide the current time point to the memory, the processing unit records and stores a voltage and the remaining power of the battery at the time point in the memory.

In an embodiment, the processing unit includes an independent power source to supply an operation voltage to the processing unit.

In order to achieve the objective, the present invention provides a charge control method including steps of: integrating a power consumption of an electronic device at a previous time point, a sleep signal, a boot signal, a hibernate signal or a shutdown signal received by the electronic device at the previous time point, a charge status of a charger at the previous time point, a remaining power of a battery at a previous time point, to be previous usage information; storing the previous usage information in the memory; based on the previous usage information and an algorithm, disposing a processing unit to create an estimation model, wherein the battery provides a current voltage to the electronic device at a current time point, the estimation model estimates an estimated power consumption of the electronic device at the current time point, an estimated power of the battery at the current time point, and a charge probability of the charger, wherein the current time point and the previous time point comprise at least one of a boot time of the electronic device, a hibernate time of the electronic device, a shutdown time of the electronic device and a sleeping time of the electronic device; determining a target voltage based on the estimated power consumption, the estimated power and the charge probability, by the processing unit; selectively controlling the charger to charge the battery based on a relationship between the current voltage and the target voltage, by the processing unit.

In an embodiment, the step of selectively controlling the charger to charge the battery includes controlling the charger to perform a first charging operation on the battery by the processing unit when the processing unit determines that the voltage is lower than the target voltage.

In an embodiment, the step of selectively controlling the charger to charge the battery includes controlling the charger to perform a second charging operation on the battery by the processing unit when the processing unit determines that the voltage is close to the target voltage, wherein a first charge amount corresponding to the first charging operation is greater than a second charge amount corresponding to the second charging operation.

In an embodiment, the step of selectively controlling the charger to charge the battery includes maintaining the battery to supply the current voltage to the electronic device when the processing unit determines that the voltage is higher than or equal to the target voltage.

In an embodiment, after the step of selectively controlling the charger to charge the battery, the charge control method includes a step of: disposing a time setting device to provide the current time point to the memory, controlling the processor to record and store the current voltage and the remaining power corresponding to the current time point, in the memory.

According to above-mentioned content, the charge control system and a method thereof of the present invention control the charging operation for the battery and monitor remaining power of the battery, regardless if the electronic device is at an operating state, a hibernate state, a sleeping state, or a shutdown state.

In addition, the charge control system and a method thereof of the present invention create an estimation model to estimate the current usage of the electronic device and the battery based on the previous usage conditions of the electronic device and the battery, in response to the power consumption required for the electronic device at an operating state, a hibernate state, a sleeping state, or a shutdown state.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
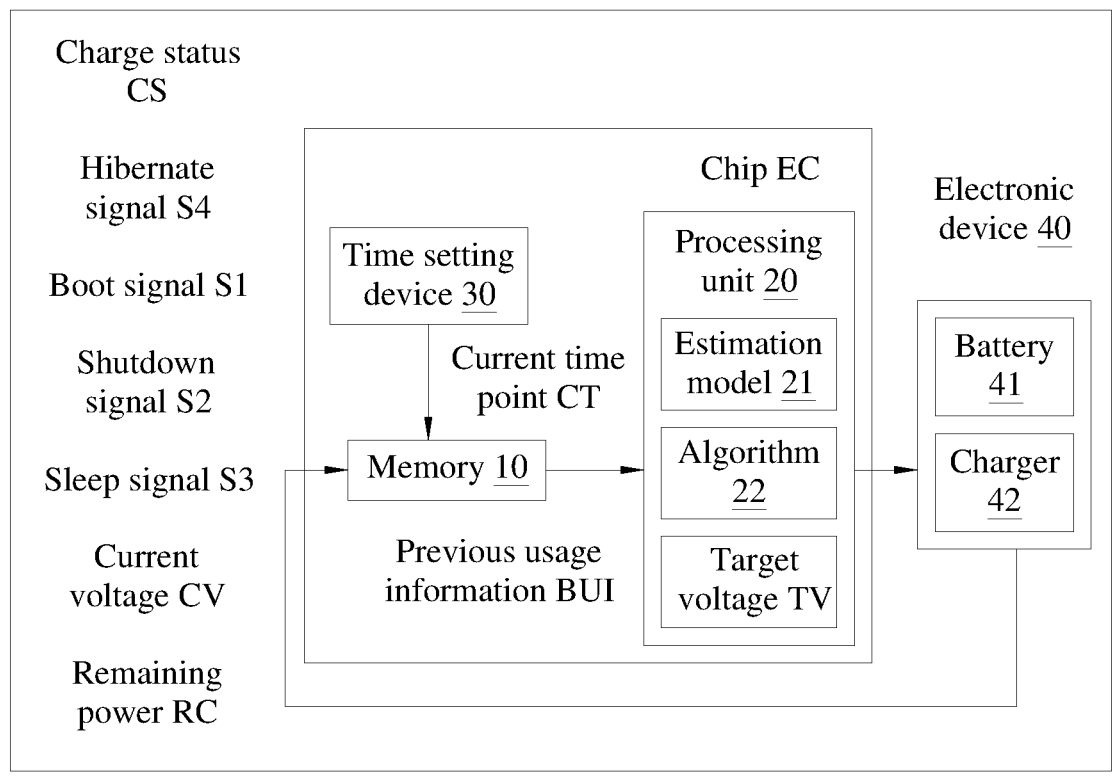
FIG. 1 is a block diagram of a charge control system of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more off the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1, which is a block diagram of a charge control system of the present invention. As shown in FIG. 1, a charge control system of the present invention includes a memory 10, a processing unit 20 and a time setting device 30. The memory 10, the processing unit 20 and the time setting device 30 are disposed on a chip EC, the chip EC is electrically connected to a battery 41 (such as a lithium battery) and a charger 42 through conductive wires, the operation of the chip EC can be independent of the central processing unit of the electronic device 40, so that the chip EC can be in operation while the electronic device 40 is at an operating state, a shutdown state, a sleeping state or a hibernate state. The chip EC is connected to a central processing unit of the electronic device 40 through conductive wires, to receive a boot signal, a shutdown signal, a sleep signal or a hibernate signal outputted from the central processing unit of the electronic device 40. The memory 10 is coupled to a battery 41 and a charger 42, the memory 10 is configured to store a power consumption of the electronic device 40 at a previous time point, a sleep signal S3, the boot signal S1, the hibernate signal S4 or the shutdown signal S2 received by the electronic device 40 at the previous time point, a charge status of the charger 42 at a previous time point, a remaining power RC of the battery 41 at a previous time point, and integrate the above-mentioned data as previous usage information BUI. In an embodiment, the memory 10 can be a random access memory, a main memory, or other memory, but the present invention is not limited to the above-mentioned examples.

The processing unit 20 is coupled to the battery 41, the charger 42 and the memory 10, the processing unit 20 is configured to create an estimation model 21 based on the previous usage information BUI and an algorithm 22, the battery 41 provides the current voltage CV to the electronic device 40 at the current time point CT, the estimation model 21 estimates an estimated power consumption of the electronic device 40 at the current time point CT, an estimated power of the battery 41 at the current time point CT, and a charge probability of the charger 42 at the current time point CT, and the processing unit 20 determines a target voltage TV based on the estimated power consumption, the estimated power, and the charge probability. The processing unit 20 selectively controls the charger 42 to charge the battery 41 based on a relationship between the current voltage CV at the current time point and a target voltage TV. In an embodiment, the processing unit 20 can be executed by single processor or multiple distributed processors.

The current time point CT and the previous time point include at least one of the boot time of the electronic device 40, the hibernate time of the electronic device 40, the shutdown time of the electronic device 40 or the sleeping time of the electronic device 40. The estimation of the estimation model 21 can be adjusted based on different algorithm 22; in an embodiment, the algorithm 22 can be an averaging algorithm, a neural network algorithm, a regression analysis method or a background monitoring method. The estimating operations of the algorithm 22 and the estimation model 21 will be described in the following paragraphs.

In addition, the present invention can include a time setting device 30 and an independent power source. The time setting device 30 is coupled to the memory 10 and configured to provide the current time point CT to the memory 10, the processing unit 20 records the current voltage CV of the battery 41 at the current time point, a remaining power RC of the battery 41, or a boot signal, a shutdown signal, a sleep signal or a hibernate signal outputted from the central processing unit of the electronic device 40, and the charge status of the charger 42, and stores the current voltage CV, the remaining power RC of the battery 41, the boot signal, the shutdown signal, the sleep signal or the hibernate signal outputted from the central processing unit of the electronic device 40, and the charge status of the charger 42, in the memory 10. The current voltage CV at the current time point CT, the remaining power RC of the battery 41, the boot signal, the shutdown signal, the sleep signal, or the hibernate signal outputted from the central processing unit of the electronic device 40, and the charge status of the charger 42 can be used as a part of the previous usage information BUI, to make the estimation of the estimation model 21 more accurate. The time setting device 30 can calibrate time with the electronic device 40 in advance or directly calibrate time by an external circuit. The time provided by the time setting device 30 can include, but not limited to, second, minute, hour, week, date and month. The independent power source supplies an operation voltage to the processing unit 20, the time setting device 30 and the memory 10 regardless of the central processing unit of the electronic device 40 is in a power-off state, a booting state or sleep status, so that the processing unit 20 can be in operation without being affected by the usage status of the electronic device 40. In an embodiment, the independent power source can be a mercury battery or other type of battery, but the present invention is not limited to the above-mentioned examples.

Figure 2:
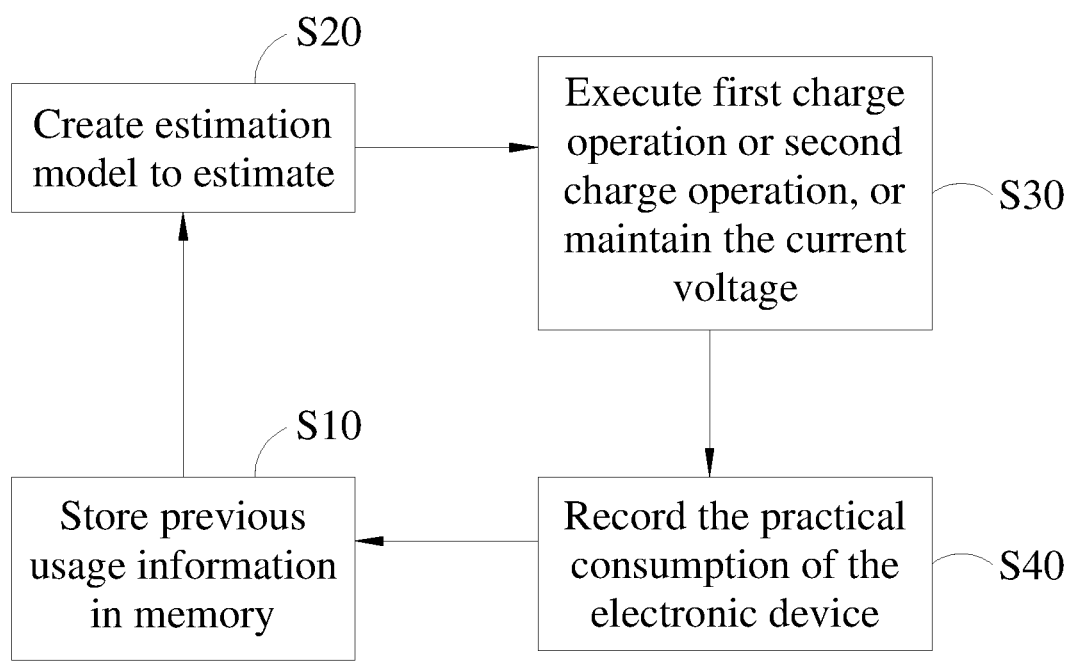
FIG. 2 is a diagram of an operation mechanism of a charge control system, according to the present invention.

Please refer to FIG. 2, which is a schematic diagram of operation mechanism of a charge control system, according to the present invention. The operation mechanism of a charge control system is illustrated in the following paragraphs with reference to FIG. 1 and FIG. 2. In a process S10, the memory 10 pre-stores the previous usage information BUI, the previous usage information BUI can include the power consumption of the electronic device 40 at the previous time point, the sleep signal S3 received by the electronic device 40 at the previous time point, the boot signal S1, the hibernate signal S4 or the shutdown signal S2, the charge status of the charger 42 at the previous time point, the remaining power RC of the battery 41 at the previous time point. In another embodiment, the previous usage information BUI can include other data or information which assists in determining charge condition of the battery, and the present invention is not limited to the above-mentioned examples. In an embodiment, the processing unit 20 can be executed by single processor or multiple distributed processors.

In a process S20, the processing unit 20 creates an estimation model 21 based on the previous usage information BUI and an algorithm 22 for estimation, the battery 41 provides the current voltage CV to the electronic device 40 at the current time point CT, the estimation model 21 estimates the estimated power consumption of the electronic device 40 at the current time point CT, the estimated power of the battery 41 at the current time point CT, and the charge probability of the charger 42 at the current time point CT; the processing unit 20 determines the target voltage TV based on the estimated power consumption, the estimated power, and the charge probability, and the processing unit 20 compares the target voltage TV and the current voltage CV.

In a process S30, when the processing unit 20 determines that the current voltage CV is lower than the target voltage TV, the processing unit 20 controls the charger 42 to perform a first charging operation on the battery 41; that is, the remaining power RC of the battery 41 at the current time point is insufficient for the electronic device 40 to normally operate for a period later, so the processing unit 20 controls the charger 42 to charge the battery 41 with high current, for example, the high current can be 2A.

When the processing unit 20 determines that the current voltage CV is close to the target voltage TV, the processing unit 20 controls the charger 42 to perform a second charging operation on the battery 41, wherein a first charge amount corresponding to the first charging operation is greater than a second charge amount corresponding to the second charging operation; that is, the remaining power RC of the battery 41 at the current time point CT is slightly insufficient for the electronic device 40 to fully operate but sufficient for the electronic device 40 to normally operate for a period later, so the processing unit 20 controls the charger 42 to charge the battery 41 with low current; for example, low current can be 0. 1A. The equation for charging battery 41 by charger 42 is as follows:

$$\sum_{t=t_{remove}}^{t_{plugin}} \left(\frac{1}{N}\sum P[t]\right)$$

-continued $$T_{pre} = \frac{C}{I}$$

wherein C is the amount of electricity to be charged into the battery 41 by the charger 42, $t_{plugin}$ is an estimated time point for the charger 42 to be plugged, and $t_{remove}$ is an estimated time point for the charger 42 to be unplugged, N is the number of P[t] series, P[t] is power consumption data of the electronic device 40 at the time point t previously; $T_{pre}$ is a time point at which the charger 42 must be charged in advance, and I is the charging current.

When the processing unit 20 determines that the current voltage CV is higher than or equal to the target voltage TV, the battery 41 is maintained to supply the current voltage CV to the electronic device 40; that is, the remaining power RC of the battery 41 at the current time point CT is sufficient for the electronic device 40 to fully operate for a period later, so the processing unit 20 does not need to control the charger 42 to charge the battery 41.

In a process S40, after the practical consumption of the electronic device 40, the processing unit 20 records the remaining power RC of the battery 41, the current voltage CV provided to the electronic device 40 by the battery 41 at the current time point CT, the usage status of the electronic device 40, the target voltage TV estimated by the estimation model 21, whether the charger 42 charges the battery 41, and stores the above-mentioned data in the memory 10. The time setting device 30 can provide the current time point CT to the memory 10, the memory 10 stores the remaining power RC, the current voltage CV, the target voltage TV and the usage status of the electronic device 40 corresponding to the current time point CT, and whether the charger 42 charges the battery 41.

Figure 3:
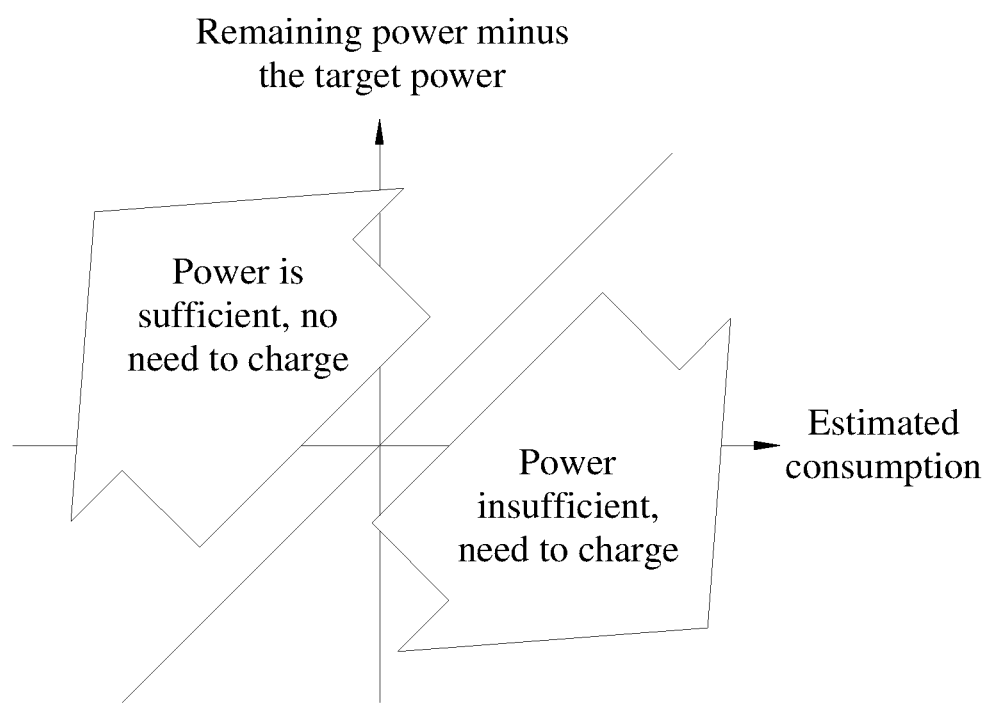
FIG. 3 is a schematic view of evaluation of remaining power of a battery of a charge control system, according to the present invention.

Please refer to FIG. 3, which is a schematic view of evaluation of a remaining power of a battery of a charge control system, according to the present invention. As shown in FIGS. 1 and 3, the processing unit 20 subtracts the target power from the remaining power RC of the battery 41, and estimates whether the power of the battery 41 is sufficient for the electronic device 40 to normally operate based on the subtraction result; for example, the target power is set as 60% of a total power of the battery 41 when the electronic device 40 is in the hibernate state or sleep state, and set as 70% of the total power of the battery 41 when the electronic device 40 is in the operating state. When the remaining power RC of the battery 41 is lower than the target power, that is, the power of the battery 41 is insufficient for use for a period later, the voltage CV provided by the battery 41 at the current time point CT is not enough for the electronic device 40 to normally operate for a period later, the processing unit 20 controls the charger 42 to charge the battery 41; when the remaining power RC of the battery 41 minus the target power is higher than or equal to the estimated power consumption, that is the power of the battery 41 is sufficient, the current voltage CV provided by the battery 41 at the current time point CT can make the electronic device 40 normally operate, so it is not necessary to control the charger 42 to charge the battery 41, the electronic device 40 consumes the remaining power RC of the battery 41.

Figure 4:
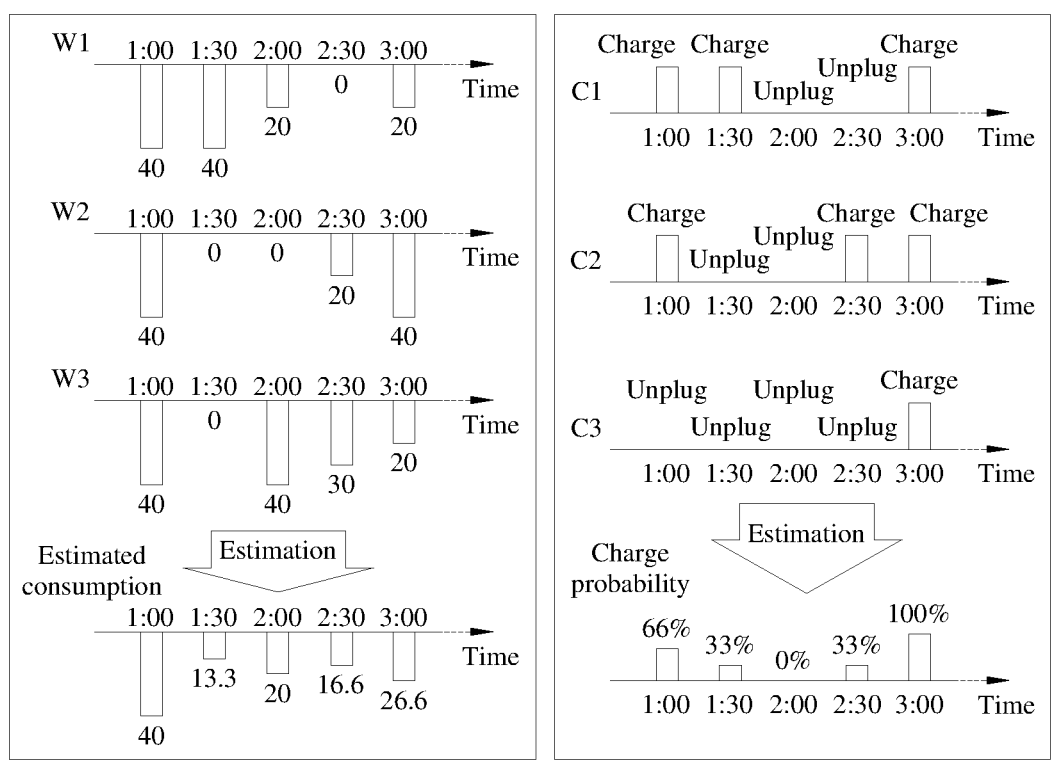
FIG. 4 is a schematic view of an estimating operation of an estimation model of the present invention.

Please refer to FIG. 4, which is a schematic view of an estimation model of the present invention. In an embodiment. As shown in FIG. 4, the algorithm 22 is averaging algorithm, the power consumption data W1 is the power consumption of the electronic device 40 at a time point in Monday afternoon, the power consumption data W2 is the power consumption of the electronic device 40 at a time point in Tuesday afternoon, the power consumption data W3 is the power consumption of the electronic device 40 at a time point in Wednesday afternoon, the estimation model 21 calculates the average of the power consumption data W1, the power consumption data W2 and the power consumption data W3 to estimate the estimated power consumption of the electronic device 40 at a time point in Thursday afternoon; the charger data C1 is the charge status of the charger 42 at a time point in Monday afternoon, the charger data C2 is the charge status of the charger 42 at a time point in Tuesday afternoon, the charger data C3 is the charge status of the charger 42 at a time point in Wednesday afternoon, the estimation model 21 calculates the average of the charger data C1, the charger data C2 and the charger data C3 to estimate the charge probability corresponding to a time point in Thursday afternoon, the charge probability 100% indicates that the charger 42 charges the battery 41, that is, the charger 42 is plugged with the electronic device 40, the charge probability 0% indicates that the charger 42 is separated from the battery 41 and does not charge the battery 41 (that is, the charger 42 is unplugged out from the electronic device 40), when the charge probability is lower than 50%, it determines that the charger 42 is about to be unplugged from the electronic device 40.

In another embodiment, the algorithm 22 is a neural network algorithm, the estimation model 21 is a neural network of the processing unit 20, the power consumption data W1, the power consumption data W2, the power consumption data W3 and other power consumption data stored in the memory 10 are inputted into the neural network of the processing unit 20, and the charger data C1, the charger data C2, the charger data C3 and other charger data stored in the memory 10 are also inputted into the neural network of the processing unit 20, and the neural network performs deep learning based on the power consumption data and the charger data, so that the neural network estimates the estimated power consumption and charge probability of the electronic device 40 at the time point in Thursday afternoon based on the power consumption data and the charger data.

In another embodiment, the algorithm 22 is the regression analysis method, the estimation model 21 computes the power consumption data W1, the power consumption data W2, the power consumption data W3 based on the formula of regression analysis method, to obtain a first regression line; the estimation model 21 computes the charger data C1, the charger data C2, and the charger data C3 based on the formula of regression analysis method, to obtain a second regression line, so that the estimation model 21 estimates the estimated power consumption and charge probability of the electronic device 40 at the time point in Thursday afternoon, based on the first regression line and an second regression line.

In another embodiment, the algorithm 22 is the background monitoring method, the calendar and weather information and power consumption (the power consumption data W1, the power consumption data W2, the power consumption data W3 and other power consumption data) of the battery 41 based on the date calendar in the operating system are displayed after the electronic device 40 is turned on, the time setting device 30 obtain the time of the electronic device 40 from the calendar, to obtain the current time point CT (Thursday). The estimation model 21 estimates the estimated power consumption and the charge probability at time point in Thursday afternoon, based on the calendar, weather information, and the power consumption of the battery 41 based on calendar.

Figure 5:
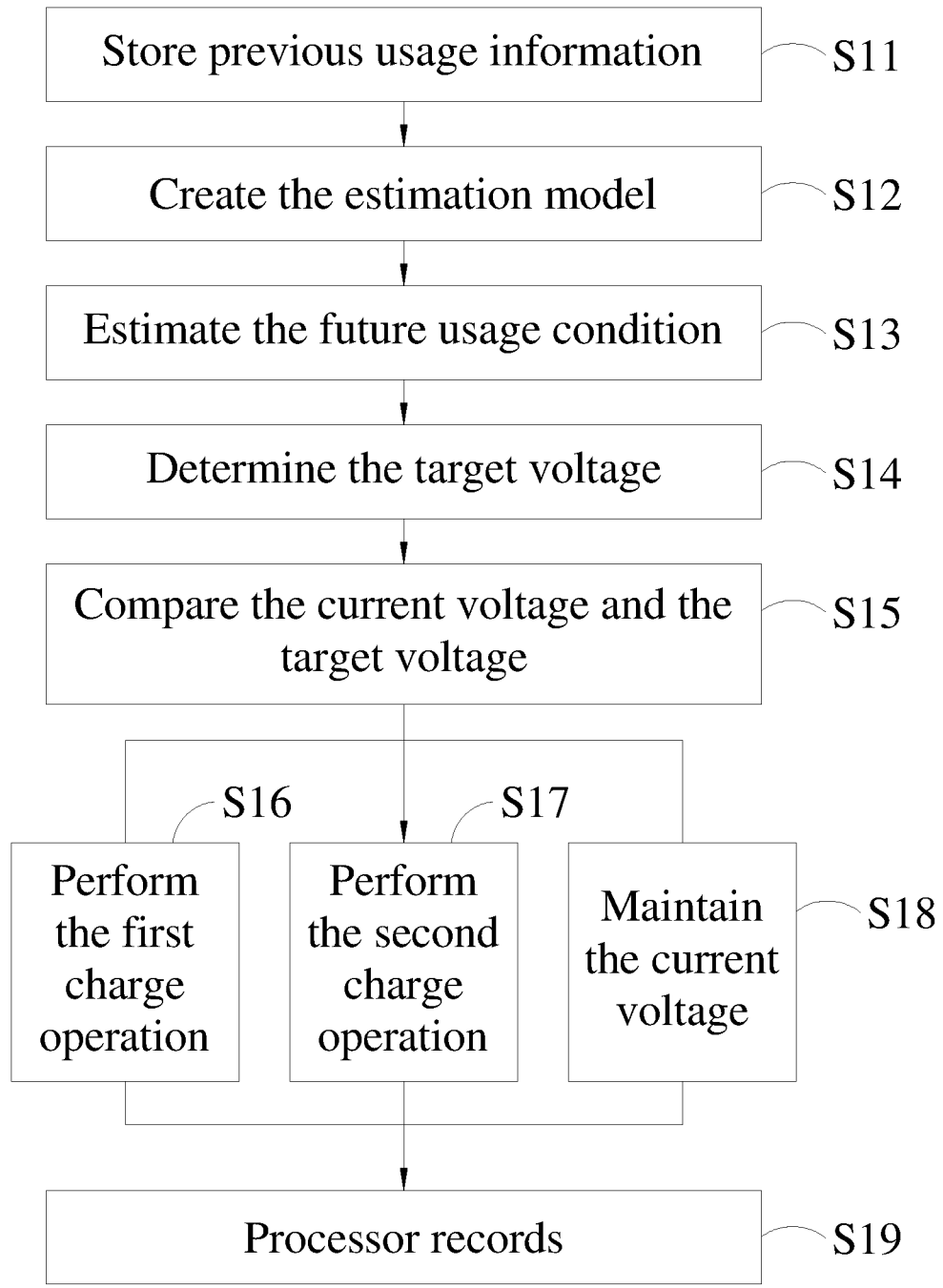
FIG. 5 is a flowchart of a charge control method of the present invention.

Please refer to FIG. 5, which is a flowchart of a charge control method of the present invention. As shown in FIGS. 1 and 5, the charge control method of the present invention is illustrated in the following paragraphs. In a step S11, the power consumption of the electronic device 40 at the previous time point, the sleep signal S3, the boot signal S1, the hibernate signal S4 or the shutdown signal S2 received by the electronic device 40 at the previous time point, the charge status of the charger 42 at the previous time point, the remaining power RC of the battery 41 at the previous time point, as the previous usage information BUI, are integrated as the previous usage information BUI and stored in the memory 10.

In a step S12, the processing unit 20 is disposed to create an estimation model 21 based on the previous usage information BUI and an algorithm 22, the battery 41 provides the current voltage CV to the electronic device 40 at the current time point CT.

In a step S13, the estimation model 21 estimates an estimated power consumption of the electronic device 40 at the current time point, the estimated power of the battery 41 at the current time point CT, and the charge probability of the charger 42, the current time point CT and the previous time point includes at least one of the boot time of the electronic device 40, the hibernate time of the electronic device 40, the shutdown time of the electronic device 40, and the sleeping time of the electronic device 40.

In a step S14, the processing unit 20 determines the target voltage TV based on the estimated power consumption, the estimated power, and the charge probability.

In a step S15, the processing unit 20 compares the current voltage CV at the current time point CT and the target voltage TV; when the processing unit 20 determines that the current voltage CV is lower than the target voltage TV, a step S16 is executed; when the processing unit 20 determines that the current voltage CV is close to the target voltage TV, a step S17 is executed; when the processing unit 20 determines that the current voltage CV is higher than the target voltage TV, a step S18 is executed.

In a step S16, the electronic device 40 consumes power of the battery 41 at the previous time point, the remaining power RC of the battery 41 is insufficient for the electronic device 40 to normally operate for a period later, so the processing unit 20 controls the charger 42 to perform the first charging operation on the battery 41, the processing unit 20 controls the charger 42 to charge the battery 41 with high current.

In a step S17, the remaining power RC of the battery 41 is just enough to support the electronic device 40 to barely operate for a period later, so the processing unit 20 controls the charger 42 to perform the second charging operation on the battery 41, the processing unit 20 controls the charger 42 to charge the battery 41 with high current.

In a step S18, the remaining power RC of the battery 41 is enough for the electronic device 40 to normal operate for a period later, the battery 41 is maintained to supply the current voltage CV to the electronic device 40, the electronic device 40 consumes the remaining power RC of the battery 41.

In a step S19, the time setting device 30 provides the current time point CT to the memory 10, so as to control the processing unit 20 to record and store the current voltage CV and the remaining power RC corresponding to the current time point CT in the memory 10; the current voltage CV and the remaining power RC corresponding to the current time point CT are used as the part of the previous usage information BUI, to make estimation model 21 better.

Figure 6:
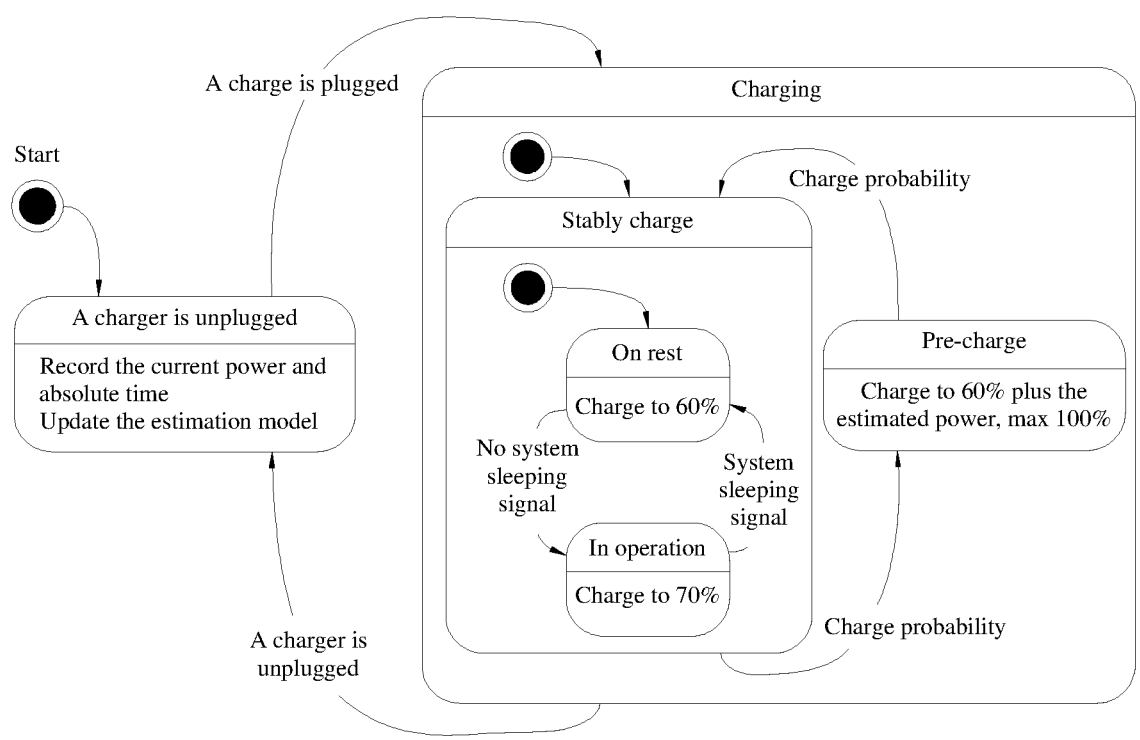
FIG. 6 is a schematic diagram of a first application embodiment of a charge control system, according to the present invention.

Please refer to FIG. 6, which is a schematic diagram of the first application embodiment of a charge control system, according to the present invention. As shown in FIGS. 1 and 6, when the charger 42 is not connected to the battery 41 (that is, the charger 42 is unplugged), the processing unit 20 records and stored the remaining power RC of the battery 41 at the current time point CT in the memory 10 when the charger 42 is unplugged, the time setting device 30 provides the current time point CT at which the charger 42 is unplugged from the battery 41, to the memory 10, and the memory 10 uses the remaining power RC at the current time point CT as the previous usage information BUI, to update the estimation model 21 of the processing unit 20. When the charger 42 is connected to the battery 41 again, the charger 42 stably charges again the battery 41.

When the electronic device 40 is not in use, the central processing unit of the electronic device 40 outputs the sleep signal S3 to enter the sleep state, the charger 42 charges the battery 41 to the 60% of total power; when the user starts to operate the electronic device 40, the central processing unit of the electronic device 40 outputs the boot signal S1 or the wake-up signal, the charger 42 charges the battery 41 to 60% of the total power capability; when the charge probability is lower than 50%, the processing unit 20 controls the other peripheral charging device to charge the battery 41 to a preset charge amount, such as 60% of the total power capability of the battery 41 plus the estimated power consumption of the processing unit 20. When the charge probability is higher than 50%, the charger 42 stably charges the battery 41.

Figure 7:
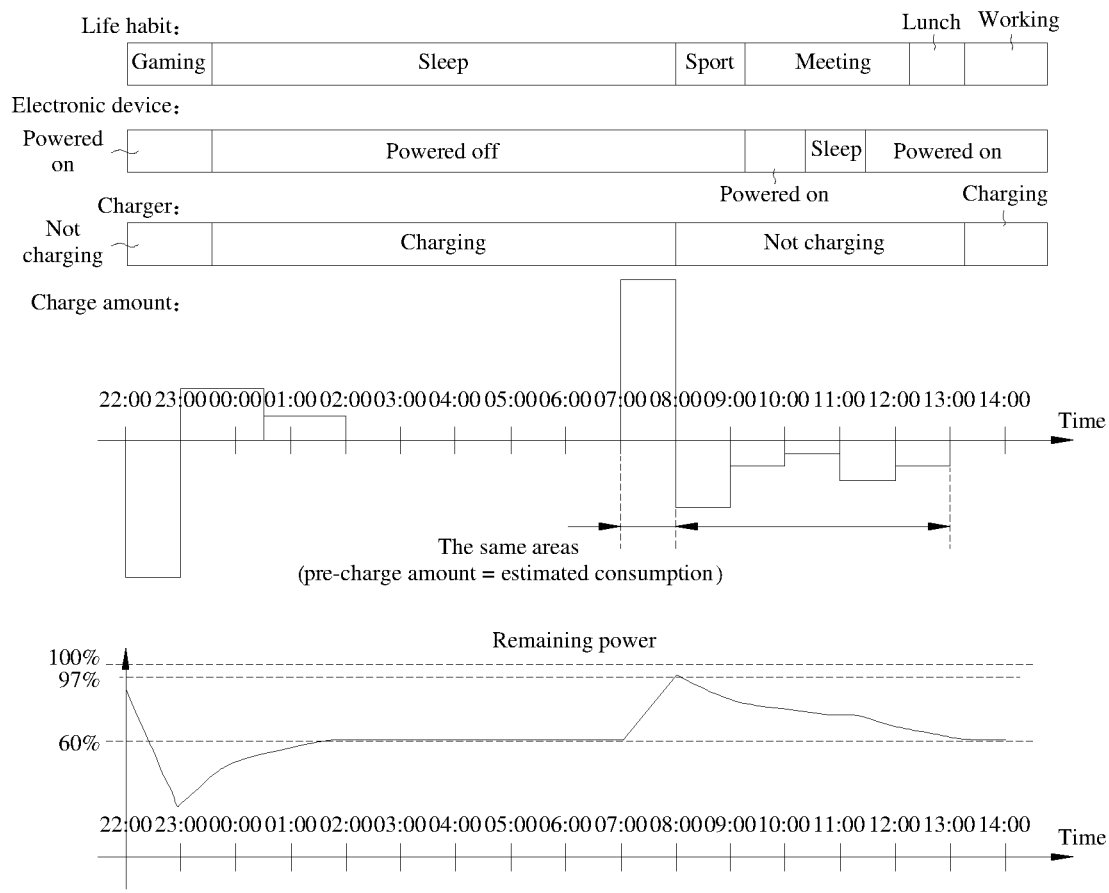
FIG. 7 is a schematic diagram of a second application embodiment of a charge control system, according to the present invention.

Please refer to FIG. 7, which is a schematic diagram of a second application embodiment of a charge control system, according to the present invention. As shown in FIGS. 1 and 7, the charge status of the charger 42 is changed in response to the usage status of the electronic device 40; it is worth noting that when the electronic device 40 is shut down, the processing unit 20 controls the charger 42 to perform charging from 7:00 to 8:00 in advance, the charger 42 charges the remaining power RC of the battery 41 to a preset charge amount, which is equal to the power consumption of the electronic device 40 from 8:00 pm to 13:00; or the processing unit 20 controls the other peripheral charging device to charge the battery 41 to the preset charge amount, so that the electronic device 40 has sufficient power for normal operation when being turned on.

According to above-mentioned content, the charge control system and a method thereof of the present invention can control the charging operation for the battery 41 and monitor remaining power of the battery 41, create the estimation model 21 to estimate the current usage of the electronic device 40 and the battery 41 based on the previous usage conditions of the electronic device 40 and the battery 41, in response to the power consumption required for the electronic device 40 regardless if the electronic device 40 is in the operating state, the hibernate state, the sleeping state or the shutdown state.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A charge control system, comprising:
   a memory, coupled to a battery of an electronic device and a charger, and configured to store and integrate a power consumption of the electronic device at a previous time point, a sleep signal, a boot signal, a hibernate signal or a shutdown signal received by the electronic device at the previous time point, a charge status of the charger at the previous time point, a remaining power of the battery at the previous time point, to be previous usage information; and a processing unit, coupled to the battery, the charger and the memory, and configured to create an estimation model based on the previous usage information and an algorithm, wherein the battery provides a current voltage to the electronic device at the current time point, the estimation model estimates an estimated power consumption of the electronic device at the current time point, an estimated power of the battery at the current time point, and a charge probability of the charger at the current time point, the processing unit determines a target voltage based on the estimated power consumption, the estimated power, and the charge probability, wherein the current time point and the previous time point comprise at least one of a boot time of the electronic device, a hibernate time of the electronic device, a shutdown time of the electronic device and a sleeping time of the electronic device;

wherein the processing unit selectively controls the charger to charge the battery based on a relationship between the current voltage and the target voltage.

2. The charge control system according to claim 1, wherein when the processing unit determines that the voltage is lower than the target voltage, the processing unit controls the charger to perform a first charging operation on the battery.

3. The charge control system according to claim 2, wherein when the processing unit determines that the voltage is close to the target voltage, the processing unit controls the charger to perform a second charging operation on the battery, and a first charge amount corresponding to the first charging operation is greater than a second charge amount corresponding to the second charging operation.

4. The charge control system according to claim 1, wherein when the processing unit determines that the voltage is higher than or equal to the target voltage, the battery is maintained to supply the current voltage to the electronic device.

5. The charge control system according to claim 1, further comprising a time setting device, wherein the time setting device is coupled to the memory, the time setting device is configured to provide the current time point to the memory, the processing unit records and stores a voltage and the remaining power of the battery at the time point in the memory.

6. The charge control system according to claim 1, wherein the processing unit comprises an independent power source to supply an operation voltage to the processing unit.

7. A charge control method, comprising:
integrating a power consumption of an electronic device at a previous time point, a sleep signal, a boot signal, a hibernate signal or a shutdown signal received by the electronic device at the previous time point, a charge status of a charger at the previous time point, a remaining power of a battery at a previous time point, to be previous usage information;

storing the previous usage information in the memory;

based on the previous usage information and an algorithm, disposing a processing unit to create an estimation model, wherein the battery provides a current voltage to the electronic device at a current time point, the estimation model estimates an estimated power consumption of the electronic device at the current time point, an estimated power of the battery at the current time point, and a charge probability of the charger, wherein the current time point and the previous time point comprise at least one of a boot time of the electronic device, a hibernate time of the electronic device, a shutdown time of the electronic device and a sleeping time of the electronic device;

determining a target voltage based on the estimated power consumption, the estimated power and the charge probability, by the processing unit; and selectively controlling the charger to charge the battery based on a relationship between the current voltage and the target voltage, by the processing unit.

8. The charge control method according to claim 7, wherein the step of selectively controlling the charger to charge the battery comprises:
when the processing unit determines that the voltage is lower than the target voltage, controlling the charger to perform a first charging operation on the battery, by the processing unit.

9. The charge control method according to claim 8, wherein the step of selectively controlling the charger to charge the battery comprises:
when the processing unit determines that the voltage is close to the target voltage, controlling the charger to perform a second charging operation on the battery, by the processing unit,
wherein a first charge amount corresponding to the first charging operation is greater than a second charge amount corresponding to the second charging operation.

10. The charge control method according to claim 7, wherein the step of selectively controlling the charger to charge the battery comprises:
when the processing unit determines that the voltage is higher than or equal to the target voltage, maintaining the battery to supply the current voltage to the electronic device.

11. The charge control method according to claim 7, wherein after the step of selectively controlling the charger to charge the battery, further comprising:
disposing a time setting device to provide the current time point to the memory, controlling the processor to record and store the current voltage and the remaining power corresponding to the current time point, in the memory.

* * * * *